United States Patent
Pfeffer et al.

(10) Patent No.: US 12,545,052 B2
(45) Date of Patent: Feb. 10, 2026

(54) ELECTRICALLY DRIVEABLE STEERING AXLE AND VEHICLE

(71) Applicant: ZF Friedrichshafen AG, Friedrichshafen (DE)

(72) Inventors: Andreas Pfeffer, Viechtach (DE); Franz Reitinger, Esternberg (AT); Alexander Mühlbauer, Windorf (DE); Tobias Brilka, Iggensbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 18/304,435

(22) Filed: Apr. 21, 2023

(65) Prior Publication Data
US 2023/0373245 A1  Nov. 23, 2023

(30) Foreign Application Priority Data
Apr. 27, 2022  (DE) .................. 10 2022 204 059.7

(51) Int. Cl.
*B60K 1/00* (2006.01)
*B60B 35/00* (2006.01)
(Continued)

(52) U.S. Cl.
CPC .......... *B60B 35/003* (2013.01); *B60B 35/125* (2013.01); *B60B 35/14* (2013.01);
(Continued)

(58) Field of Classification Search
CPC ... B60B 35/003; B60B 35/125; B60K 17/165; B60K 2001/001; B62D 7/20;
(Continued)

(56) References Cited

U.S. PATENT DOCUMENTS

| 4,775,026 A | * | 10/1988 | Sollbach | ................. F16H 48/24 475/150 |
| 7,497,286 B2 | * | 3/2009 | Keller | ..................... B60K 6/48 180/65.6 |

(Continued)

FOREIGN PATENT DOCUMENTS

| AT | 522897 A1 | 3/2021 | |
| CN | 109421433 A | * 3/2019 | ........... B60K 17/165 |

(Continued)

OTHER PUBLICATIONS

German Patent Office, Office Action Corresponding to application No. 10 2022 204 059.7 (mailed Feb. 28, 2023).

*Primary Examiner* — Sherry L Estremsky
(74) *Attorney, Agent, or Firm* — Finch & Maloney PLLC

(57) ABSTRACT

The invention relates to an electrically drivable steering axle (10) having an axle housing (11), an electric motor (12), a transmission (13), a differential (14) with a first output shaft (18) and a second output shaft (18'), a first wheel head (15), a second wheel head (16) and a steering linkage (17, 17', 17"). The electric motor (12) is drive-connected to the first wheel head (15) and to the second wheel head (16) via the transmission (13) and the differential (14). The steering axle (10) according to the invention is distinguished by the fact that the electric motor (12), the transmission (13), and the differential (14) are arranged coaxially with the first output shaft (18) and the second output shaft (18'). The invention additionally relates to a corresponding vehicle.

9 Claims, 2 Drawing Sheets

(51) Int. Cl.
  *B60B 35/12* (2006.01)
  *B60B 35/14* (2006.01)
  *B60K 17/16* (2006.01)
  *B62D 7/20* (2006.01)
  *F16H 37/08* (2006.01)
  *B60T 1/06* (2006.01)
  *F16H 57/02* (2012.01)

(52) U.S. Cl.
  CPC .............. *B60K 1/00* (2013.01); *B60K 17/165* (2013.01); *B62D 7/20* (2013.01); *F16H 37/082* (2013.01); *B60K 2001/001* (2013.01); *B60T 1/065* (2013.01); *B60T 1/067* (2013.01); *F16H 2057/02034* (2013.01); *F16H 2057/02052* (2013.01)

(58) Field of Classification Search
  CPC ......... F16H 37/082; F16H 2057/02034; F16H 2057/02052; B60T 1/065; B60T 1/067
  See application file for complete search history.

(56) References Cited

U.S. PATENT DOCUMENTS

| | | | |
|---|---|---|---|
| 9,527,382 B2 * | 12/2016 | Smetana | B60K 1/02 |
| 9,649,923 B2 * | 5/2017 | Perlo | B60K 1/04 |
| 10,995,835 B2 * | 5/2021 | Engerman | F16H 37/082 |
| 11,235,660 B2 * | 2/2022 | Engerman | B60K 17/02 |
| 11,707,981 B2 * | 7/2023 | Gowrisankar | F16H 3/64 |
| | | | 475/150 |
| 11,848,546 B2 * | 12/2023 | Strand | H02G 3/0475 |
| 2020/0406681 A1 * | 12/2020 | Bebeti | B60K 17/356 |
| 2021/0252959 A1 * | 8/2021 | Payne | F16H 48/24 |
| 2022/0194124 A1 * | 6/2022 | Luo | B60K 1/00 |
| 2023/0143471 A1 * | 5/2023 | Byrne | B23K 11/02 |
| | | | 301/137 |

FOREIGN PATENT DOCUMENTS

| | | | | |
|---|---|---|---|---|
| DE | 202020106436 U1 * | 1/2021 | | F16H 57/02 |
| DE | 102021001773 A1 * | 6/2021 | | |
| DE | 10 2020 211 067 A1 | 3/2022 | | |
| DE | 10 2020 211 068 A1 | 3/2022 | | |
| DE | 10 2021 203 416 A1 | 10/2022 | | |
| EP | 2826653 A1 * | 1/2015 | | B60K 1/00 |
| JP | 2012240471 A * | 12/2012 | | |
| WO | WO-2019121635 A1 * | 6/2019 | | B60K 17/02 |

* cited by examiner

ELECTRICALLY DRIVEABLE STEERING AXLE AND VEHICLE

RELATED APPLICATIONS

This application claims the benefit of and right of priority under 35 U.S.C. § 119 to German patent application no. 10 2022 204 059.7 filed Apr. 27, 2022, the contents of which are incorporated herein by reference in its entirety.

FIELD OF THE DISCLOSURE

The present invention relates to an electrically drivable steering axle and to a corresponding vehicle.

BACKGROUND

Electrically driven vehicles such as, for instance, all-wheel-drive heavy-goods vehicles, cranes, wheeled tanks and special vehicles are known in the prior art. These electrically driven vehicles are either driven purely electrically, i.e. they have exclusively an electric battery or an electric storage battery for their energy supply, or they are driven diesel-electrically, which means that the required energy is provided by a diesel-driven generator, usually in conjunction with an electric buffer storage such as, for example, an appropriately dimensioned capacitor. In all cases, the mechanical power required for the travel drive, or the working drive, is provided by one or more electric motors. The travel drive is typically effected via a drivable axle, or a steerable drivable axle, which comprises one or more transmissions and a brake in or on an axle body. Driving of the axle in this case is effected by the feeding-in of a rotational speed and a torque from outside of the axle body.

In this context, known from the as yet unpublished DE 10 2021 203 416.0 of the applicant is a transmission for a passenger car, comprising an input shaft, an output shaft, two planetary gear sets arranged coaxially with the input shaft, and two brakes. The input shaft drives the sun gears of the planetary gear train, while the output shaft is driven by the planet carriers. The ring gears of the planetary gear train may be fixed to a non-rotational component via the two brakes. The transmission of DE 10 2021 203 416.0 may be used, for example, for a steerable front axle.

AT 522 897 A1 describes an electric axle for heavy-duty applications. The electric axle comprises two electric motors, an at least two-stage planetary gear train and two output shafts. The electric motors in this case are arranged on opposite sides of the two output shafts and are connected to the output shafts via the two-stage planetary gear train.

However, the known electrically drivable axles are disadvantageous in that, due to their design, they have a high total weight and a large installation space requirement. In addition, the feeding-in of a torque, or rotational speed, into the axle from outside of the axle body reduces the efficiency.

SUMMARY

It is an object of the invention to propose an improved electrically drivable steering axle.

This object is achieved according to the invention by the electrically drivable steering axle as disclosed herein. Advantageous designs and developments of the invention will be apparent from the present disclosure.

The invention relates to an electrically drivable steering axle, comprising an axle housing, an electric motor, a transmission, a differential having a first output shaft and a second output shaft, a first wheel head, a second wheel head and a steering linkage, the electric motor being drive-connected to the first wheel head and to the second wheel head via the transmission and the differential. The steering axle according to the invention is distinguished by the fact that the electric motor, the transmission and the differential are arranged coaxially with the first output shaft and the second output shaft.

The invention thus describes an electrically drivable steering axle that is composed of at least the following elements: axle housing, electric motor, transmission, differential, first and second output shaft, first and second wheel head and steering linkage.

The axle housing in this case constitutes a kind of basic structure of the steering axle, on which, or in which, all of the above-mentioned and possibly other elements are arranged. Due to this arrangement in, or on, the axle housing, it is advantageously a rigid axle, or a beam axle.

The electric motor may be realized as a synchronous or as an asynchronous machine, in particular as a three-phase synchronous or as a three-phase asynchronous machine.

Advantageously, assigned to the electric motor there is an inverter that converts direct current, which is preferably provided by an electric battery, into alternating current suitable for controlling, or operating, the electric motor.

The transmission is preferably realized as a shiftable and at least two-stage transmission, such that a suitable ratio of the torque provided by the electric motor and fed into the transmission, and of the rotational speed provided by the electric motor and fed into the transmission, may be set as required.

The differential preferably has an input shaft via which the rotational speed converted by the transmission and the torque converted by the transmission can be fed into the differential. The fed-in rotational speed and fed-in torque are distributed in the differential to the first and the second output shaft on the basis of a rotational resistance of the first and the second output shaft.

The first output shaft of the differential connects the differential in a driving manner to the first wheel head, and the second output shaft of the differential connects the differential in a driving manner to the second wheel head. Advantageously, the first and the second wheel head each comprise a wheel hub and a wheel shaft for receiving a wheel. Furthermore, advantageously, the first and the second wheel head each also comprise a pivot bearing assembly to enable steering movements of the wheel hub and wheel shaft to be performed.

Moreover, the first and the second wheel head are mechanically connected via the steering linkage in such a manner that a steering movement of the first wheel head is transmitted to the second wheel head, advantageously in compliance with the so-called Ackermann condition. The steering linkage is preferably actuated by means of an electric steering motor assigned to the steering linkage. As an alternative, preferably, hydraulic actuation of the steering linkage is also conceivable.

A torque, or a rotational speed, generated by the electric motor is fed into the transmission via a motor shaft of the electric motor, where it is converted on the basis of an engaged gear and output. The converted torque and the converted rotational speed are fed into the differential via an output shaft of the transmission, or an input shaft of the differential, and distributed by the differential to the first and the second output shaft. The first and the second output shaft then drive the first and the second wheel head, or their wheel shafts.

According to the invention, it is now provided that the electric motor, the transmission and the differential are arranged coaxially with the first output shaft and the second output shaft. This results in the advantage that the steering axle according to the invention has a comparatively low overall weight and also only requires comparatively little installation space, in particular compared to a parallel arrangement of the electric motor with respect to the first output shaft and to the second output shaft. In addition, the said coaxial arrangement also improves the efficiency of the steering axle, since it is possible to dispense with an additional spur gear pair, which is required in the case of a parallel arrangement to bridge the centre distance. In addition, the steering axle according to the invention provides a simple way of realizing an all-wheel drive in a vehicle comprising the steering axle, for example a working machine, in particular an off-road working machine, an all-wheel-drive heavy-goods vehicle, crane, wheeled tank or special vehicle.

According to a preferred embodiment of the invention, it is provided that a motor shaft of the electric motor, an input shaft of the transmission, an output shaft of the transmission and an input shaft of the differential are realized as hollow shafts. This makes it easier for the electric motor, the transmission and the differential to be arranged coaxially with the output shafts.

According to a particularly preferred embodiment of the invention, it is provided that the first output shaft and the second output shaft are arranged in the hollow shafts. The first and the second output shaft are thus routed through the electric motor and the transmission, respectively, and at the same time represent the longitudinal axis of the electric motor, the transmission and the differential.

According to a further preferred embodiment of the invention, it is provided that the electric motor, the transmission and the differential are arranged in a common housing. This results in the advantage of an even more compact and space-saving arrangement of the electric motor, the transmission and the differential in the steering axle, since there is no need to provide a plurality of different individual transmissions. Advantageously, the transmission in this case is arranged between the electric motor on the input side of the transmission and the differential on the output side of the transmission.

According to a particularly preferred embodiment of the invention, it is provided that the common housing is at the same time a constituent part of the axle housing. This means that at least part of the outer wall of the common housing is also part of the outer wall of the axle housing. As a result, the steering axle according to the invention can be designed to be even more weight-saving, since the common housing is not in turn enclosed by the axle housing. Instead, the common housing may form, for example, an axially approximately central constituent part of the axle housing, which is adjoined on both sides by a further constituent part of the axle housing.

According to a further preferred embodiment of the invention, it is provided that there is a first disc brake assigned to the first wheel head, and there is a second disc brake assigned to the second wheel head. Disc brakes require comparatively little installation space and have a comparatively low weight. Thus, each of the two wheel heads can be braked individually without the steering axle becoming noticeably heavier as a result.

According to an alternative preferred embodiment of the invention, it is provided that there is a first drum brake assigned to the first wheel head, and there is a second drum brake assigned to the second wheel head. Instead of the disc brakes, a drum brake may also be assigned to each wheel head, which likewise enables the wheel heads to be braked individually.

According to a further preferred embodiment of the invention, it is provided that the transmission is realized as a planetary gear train. A planetary gear train is comparatively compact and suitable for transmitting even very high torques. In addition, as a result of the sun gear being realized as a hollow shaft, a planetary gear train can easily be arranged coaxially around the first or second output shaft.

According to a further preferred embodiment of the invention, it is provided that the steering axle furthermore comprises a differential lock assigned to the differential. Actuation of the differential lock can thus result in the differential being partially or fully locked, according to the actuation.

The invention furthermore relates to a vehicle comprising at least one steering axle according to the invention. From this, the advantages already described are also obtained for the vehicle according to the invention.

Preferably, the vehicle may also have more than one steering axle according to the invention, each further steering axle after the first steering axle being used as a so-called trailing axle. A steering angle setting of the trailing axles may advantageously be predefined by means of a suitable software algorithm in dependence on the respective vehicle geometry and the respectively set steering angle of the first steering axle. A complex mechanical connection of the steering axles is therefore not necessary.

Furthermore, preferably, it is provided that the vehicle is realized as an all-wheel-drive heavy-goods vehicle, crane, wheeled tank, special vehicle, wheeled loader, dumper, excavator, telescopic loader or tractor.

DETAILED DESCRIPTION

Identical objects, functional units and comparable components are designated by the same references across the FIGURE. These objects, functional units and comparable components are identical with regard to their technical features, unless the description explicitly or implicitly states otherwise.

Figure 1:
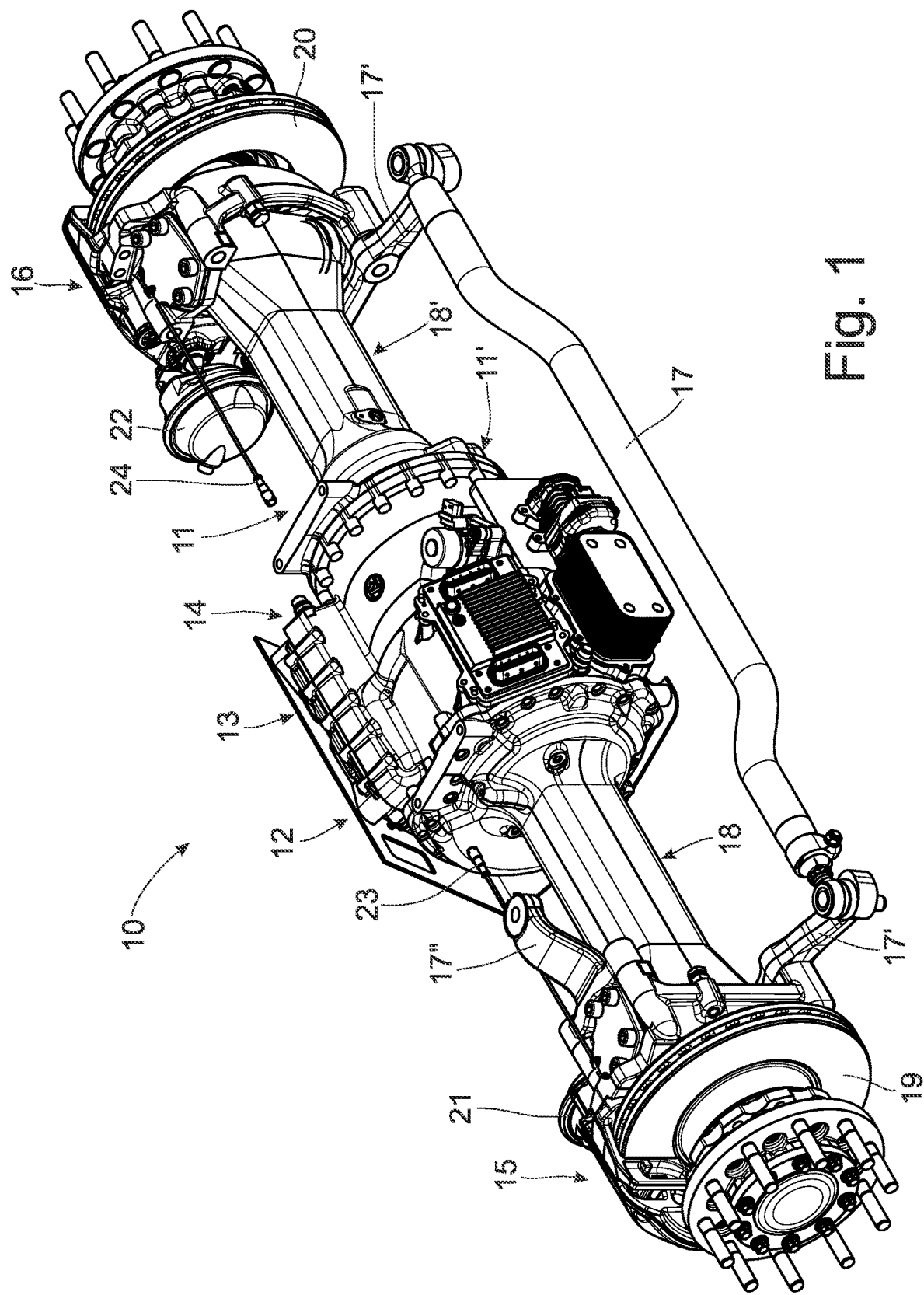
FIG. 1 shows, by way of example and in schematic form, a possible embodiment of an electrically drivable steering axle according to the invention.
Figure 2:
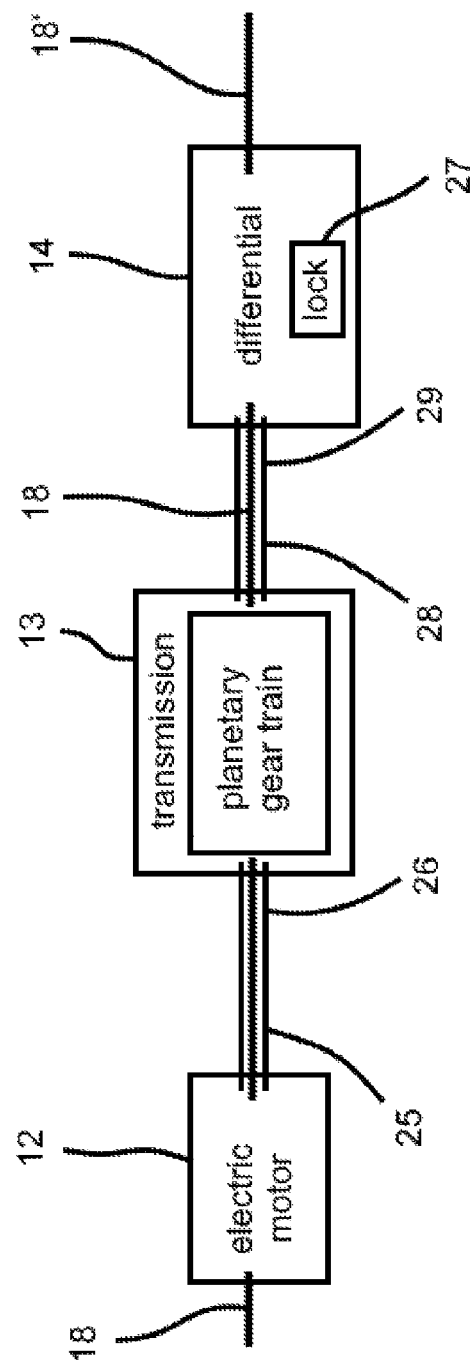
FIG. 2 shows a schematic view of the electrical drivable steering axle of FIG. 1.

FIGS. 1 and 2 show, by way of example and in schematic form, a possible embodiment of an electrically drivable steering axle 10 according to the invention. The steering axle 10 comprises an axle housing 11, an electric motor 12, a transmission 13, a differential 14 having a first output shaft 18 and a second output shaft 18', a first wheel head 15, a second wheel head 16, and a steering linkage 17, 17', 17". The steering axle 10 is a beam axle 10.

The electric motor 12, the transmission 13 and the differential 14 in this case are arranged in a common housing 11' that constitutes an axially central constituent part of the axle housing 11. In the common housing 11', the electric motor 12 is arranged on the far left in the representation in the figures, and its motor shaft 25 points to the right. Via the motor shaft 25 of the electric motor 12, or via an input shaft 26 of the transmission 13, the electric motor 12 feeds a torque and a rotational speed into the transmission 13. As an example, the motor shaft 25 of the electric motor 12 and the input shaft 26 of the transmission 13 are identical or are realized in one piece. In the representation in the figures, the transmission 13 is arranged immediately to the right of the electric motor 12 and is realized as a two-stage planetary gear train 13. The transmission 13 converts the torque and rotational speed and delivers them into the differential 14 via an output shaft 28 of the transmission 13 and an input shaft 29 of the differential 14. The output shaft 28 of the transmission 13 and the input shaft 29 of the differential 14 are also, by way of example, identical, or realized in one piece. The differential 14 comprises, by way of example, a differential lock 27 and distributes the fed-in torque, as well as the fed-in rotational speed, via the first output shaft 18 and the second output shaft 18' to the first wheel head 15 and to the second wheel head 16. In the representation in FIG. 1, the first output shaft 18 and the second output shaft 18' are concealed by the axle housing 11. Thus, the electric motor 12 is drive-connected to the first and the second wheel head 15, 16 via the transmission 13, the differential 14 and the first and the second output shaft 18, 18'.

In order to save installation space and weight, and to improve the efficiency of the steering axle 10, the electric motor 12, the transmission 13 and the differential 14 are arranged coaxially with the first output shaft 18 and the second output shaft 18' in the axle housing 11. To enable the electric motor 12, the transmission 13 and the differential 14 to be arranged coaxially around the first output shaft 18 and the second output shaft 18', the motor shaft 25 of the electric motor 12, the input shaft 26 of the transmission 13, the output shaft 28 of the transmission 13 and the input shaft of the differential 14 are each realized as hollow shafts through which respectively the first output shaft 18 and the second output shaft 18' are routed.

The first wheel head 15 and the second wheel head 16 each have a pivot bearing assembly to enable a steering movement. The steering linkage 17, 17', 17" connects the first wheel head 15 to the second wheel head 16 in such a manner that a steering movement of the first wheel head 15 is transmitted to the second wheel head 16 in compliance with the Ackermann condition. Specifically, the steering linkage 17, 17', 17" is composed of a track rod 17, two track levers 17' and a steering lever 17". The steering lever is actuated, on the basis of a steering angle of a steering wheel, by an electric steering motor (not represented in the FIGURE).

There is a first disc brake 19 assigned to the first wheel head 15, and there is a second disc brake 20 assigned to the second wheel head 16. The first disc brake 19 comprises a first brake-fluid reservoir 21, and the second disc brake 20 comprises a second brake-fluid reservoir 22. In addition, there is a first rotational-speed sensor 23 assigned to the first wheel head 15, and there is a second rotational-speed sensor 24 assigned to the second wheel head 16.

REFERENCES 10 steering axle, beam axle
11 axle housing
11' common housing
12 electric motor
13 transmission, planetary gear train
14 differential
15 first wheel head
16 second wheel head
17 track rod, steering linkage
17' track lever, steering linkage
17" steering lever, steering linkage
18 first output shaft
18' second output shaft
19 first disc brake
20 second disc brake
21 first reservoir
22 second reservoir
23 first rotational-speed sensor
24 second rotational-speed sensor
25 motor shaft
26 transmission input shaft
27 differential lock
28 transmission output shaft
29 differential input shaft

The invention claimed is:

1. An electrically drivable steering axle, comprising:
an axle housing;
an electric motor;
a shiftable transmission configured as an at least two-stage transmission and having at least two shiftable transmission ratios for converting torque from the electric motor, the transmission having a sole transmission input shaft through which torque from the electric motor is fed-into the transmission;
a differential having a first output shaft and a second output shaft;
a first wheel head;
a second wheel head;
a steering linkage, wherein the electric motor is drive-connected to the first wheel head and to the second wheel head via the transmission and the differential, and wherein the electric motor, the transmission and the differential are arranged coaxially with the first output shaft and the second output shaft; and
wherein the first and the second output shafts of the differential connect the differential to the first and the second wheel heads, respectively; and the first and the second output shafts of the differential are entirely enclosed within the axle housing from the differential to first and the second wheel heads, respectively.

2. The steering axle according to claim 1, wherein the electric motor has a motor shaft, the transmission has an input shaft and an output shaft, and the differential has an input shaft, wherein the motor shaft, the input shaft and the output shaft of the transmission, and the input shaft of the differential are configured as hollow shafts.

3. The steering axle according to claim 2, the first output shaft and the second output shaft of the differential are arranged in the hollow shafts.

4. The steering axle according to claim 1, wherein the axle housing has a common housing centrally located between the first and the second wheel heads, wherein the electric motor, the transmission, and the differential are arranged in the common housing.

5. The steering axle according to claim 4, wherein the common housing is a constituent part of the axle housing such that from the first wheel head to the second wheel head the steering axle is a beam axle or a rigid axle.

6. The steering axle according to claim 1, further comprising a first disc brake assigned to the first wheel head, and a second disc brake assigned to the second wheel head.

7. The steering axle according to claim 1, wherein the transmission is configured as a planetary gear train and the electric motor is a three-phase electric motor that is connected to an electric battery via an inverter which converts direct current from the battery to alternating current for controlling operation of the electric motor.

8. The steering axle according to claim 1, further comprising a differential lock assigned to the differential, wherein rotational speed and torque directed from the transmission to the differential are distributed to the first and the second output shafts of the differential based on a rotational resistance of the first and the second output shafts of the differential.

9. A vehicle comprising the steering axle according to claim 1.

* * * * *